July 29, 1941.   O. W. LIVINGSTON   2,250,961

ELECTRIC VALVE CIRCUITS

Filed Oct. 28, 1939

Inventor:
Orrin W. Livingston,
by Harry E. Dunham
His Attorney.

Patented July 29, 1941

2,250,961

UNITED STATES PATENT OFFICE 2,250,961

ELECTRIC VALVE CIRCUITS

Orrin W. Livingston, Schenectady, N. Y., assignor to General Electric Company, a corporation of New York Application October 28, 1939, Serial No. 301,862

11 Claims. (Cl. 250—27)

My invention relates to electric valves and more particularly to electric valve translating apparatus employing electric discharge devices of the type comprising immersion-ignitor control members.

Electric valves or electric discharge devices which employ make-alive or immersion-ignitor control members afford an economical and convenient arrangement for controlling the transfer of electric power to an associated load circuit. For example, it has been found that a pair of electric valves of this type may be connected reversely in parallel, or what is termed in technical parlance as a back-to-back relationship for the transmission of alternating current to a load circuit from an alternating current supply circuit. In accordance with the teachings of my invention described hereinafter, I provide new and improved translating circuits employing valves of this type which afford additional flexibility of control and which have the additional advantages of apparatus economy and long life.

It is an object of my invention to provide new and improved electric valve translating circuits.

It is another object of my invention to provide new and improved control circuits for electric valve translating apparatus of the type employing make-alive or immersion-ignitor control members.

It is a further object of my invention to provide a new and improved phase shifting circuit for electric valve translating apparatus employing electric valves of the type comprising immersion-ignitor control members.

Briefly stated, in the illustrated embodiments of my invention I provide an electric translating circuit for transmitting alternating current to a load circuit from an alternating current supply circuit through a pair of reversely connected electric valves which are of the type including make-alive or immersion-ignitor control members in contact with the associated cathodes. Each of the electric valves is provided with an excitation circuit and the excitation circuits are interconnected through a control circuit comprising inductive means for selectively advancing and retarding the time during the applied positive half cycles of anode-cathode voltage at which the critical ignition current is transmitted to the control members, thereby obtaining phase control of the electric valves.

Figure 1:
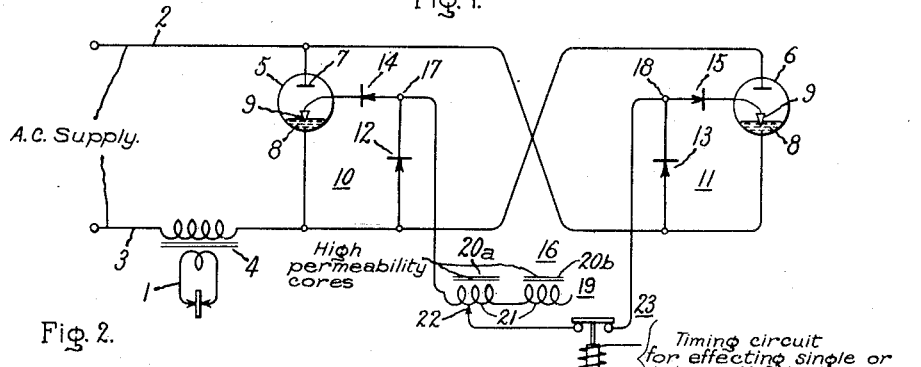

For a better understanding of my invention, reference may be had to the following description taken in connection with the accompanying drawing, and its scope will be pointed out in the appended claims. Fig. 1 diagrammatically illustrates an embodiment of my invention as applied to an electric translating circuit for energizing a load circuit, such as a welding circuit, from an alternating current supply circuit, and Figs 2-6, inclusive, represent certain operating characteristics thereof. Fig. 7 diagrammatically illustrates a modification of the arrangement shown in Fig. 1.

Referring now to Fig. 1 of the drawing, I have illustrated my invention diagrammatically as applied to an electric translating system for energizing a load circuit 1, which may be a welding circuit, from an alternating current supply circuit comprising conductors 2 and 3 through an inductive device, such as a transformer 4, and through a pair of reversely connected electric valve means 5 and 6. The electric valve means 5 and 6 are of the type employing an ionizable medium such as a gas or a vapor and each comprises an anode 7, a cathode 8 and an associated make-alive or immersion-ignitor control member 9 in contact with the associated cathode 8. The cathode 8 may be a liquid, such as mercury, or a solid such as cadmium. In either case, the immersion-ignitor control member 9 is in contact with the cathode and an arc discharge between the anode and the cathode is initiated by the transmission of a predetermined critical minimum value of current between the control member and the cathode. While the exact phenomenon occurring in the initiation of the arc discharges in electric valves of this type is not completely understood, it is quite generally accepted that the arc discharge is initiated by establishing at the surface of the cathode a predetermined minimum potential gradient. Of course, upon the transmission of the critical value of ignition current through the control member, the arc discharge is initiated. It has been found preferable in order to assure long life of the electric valve means that the current transmitted to the control members 9 be substantially entirely unidirectional. For this reason it has been found desirable to suppress as much as possible the inverse current which would otherwise tend to flow between the cathode and the control member.

I provide a pair of excitation circuits 10 and 11 associated with electric valves 5 and 6, respectively, and each of which is connected between the cathode 8 and the control member 9 of the associated electric valve. Excitation circuits 10 and 11 may comprise suitable unidirectional conducting devices, such as rectifiers 12 and 13, which are connected to the cathodes of electric valves 5 and 6, respectively. The rectifiers 12 and 13 may be of the type disclosed and claimed in United States Letters Patent 1,640,335, granted August 23, 1927, upon an application of Lars O. Grondahl. Rectifier 12 is connected to conductor 3 of the supply circuit through the primary winding of transformer 4, and the rectifier 13 is connected directly to the conductor 2 of the supply circuit. The excitation circuits 10 and 11 are also arranged so that each comprises a pair of similarly-poled serially-connected unidirectional conducting devices. That is, the excitation circuit 10 includes in series relation the rectifier 12 and a rectifier 14 connected in series relation between the cathode 8 and the control member 9; and excitation circuit 11 comprises in series relation the rectifier 13 and a rectifier 15 which, in turn, is also connected between the cathode 8 and the control member 9 of its associated main or power valve.

I provide a control circuit 16 interconnecting the excitation circuits 10 and 11 and which is connected to common junctures 17 and 18 of the rectifiers 12, 14 and 13, 15, respectively. The control circuit 16 selectively advances and retards the time during the positive half cycles of applied anode-cathode voltage of electric valves 5 and 6 at which the critical value of ignition current is transmitted to the control members 9. As a means for advancing and retarding the time at which the critical ignition current is transmitted, I may employ a saturable inductive device 19 having a core or cores 20a and 20b, a winding 21 and an adjustable tap 22. The inductive device 19 is preferably of the self-saturable type comprising core members of high permeability which saturate abruptly. These core members may be constructed of a material such as Nicaloy or Permalloy.

The feature of employing a phase shifting means connected between the excitation circuits of a pair of reversely connected electric valves having immersion-ignitor control members in a system which includes means, such as unidirectional conducting devices, connected in the excitation circuits to permit the transfer of energy therebetween or for permitting the transfer of current from the alternating current supply circuit to one excitation circuit through the other excitation circuit, is disclosed and broadly claimed in a copending patent application Serial No. 343,220 of Maurice E. Bivens, filed June 29, 1940, and which is assigned to the assignee of this application.

The winding 21 may be arranged or wound on a single core or may be wound on separate cores. As the tap 22 is moved along the winding 21, it will be understood that the potential of the loose end or the right-hand end of the winding 21 will vary, and for this reason in some instances it has been found desirable to place the windings on separate cores to limit or control the range of potential through which the terminal may vary.

In the control circuit 16 I also provide suitable means, such as switching means 23, for selectively opening and closing the control circuit to control the energization of the load circuit 1. The switching means 23 may, of course, be manually operable or may be automatically operable in response to a predetermined controlling influence. In the latter case, the switching means 23 may be provided with an actuating coil 24 which in turn may be energized from a timing circuit (not shown) for effecting a single or intermittent energization of the load circuit 1 during a predetermined single interval of time or during a predetermined number of recurrent intervals of time of definite duration.

The operation of the embodiment of my invention shown in Fig. 1 will be explained by considering the system when it is operating to transmit alternating current to the load circuit 1 from the alternating current supply circuit during an interval of time established by the closure of the switching means 23. As is well understood by those skilled in the art, the value of current conducted to the load circuit 1 is determined by the time relationship between the anode-cathode voltage and the times at which the arc discharges are initiated between the anodes and the cathodes of the electric valve means 5 and 6. As the time at which arc discharges are initiated relative to the anode-cathode voltage is advanced toward the zero value of the positive half cycles from an initial lagging position, the magnitude of the load current is increased; and, conversely, as the time of initiation of arc discharges is retarded from the zero point, the load current is decreased.

In general terms, the control circuit 16 permits adjustment or control of the phase of the ignition impulses which are transmitted to the immersion-ignitor control members 9, and hence permits control or adjustment of the value of the current transmitted to the load circuit 1. The exact manner in which circuit 16 operates is explained more fully hereinafter.

Let it be assumed that the switching means 23 is connecting the excitation circuits 10 and 11 and that electric valve 6 is conducting current. At the end of the conducting interval of electric valve 6, voltage suddenly appears across valve 6 in the reverse direction and across valve 5 in the forward direction, since the load has a lagging power factor and the voltage is negative when the current finally reaches zero. In other words, where a lagging power factor load is supplied, there is a portion of each half cycle during which the voltage and the current are of opposite polarity. This relationship may be readily understood by referring to the operating characteristics shown in Fig. 2 where the voltage and current curves are represented. During the interval $a$ it will be noted that the voltage has reversed and that the current is still positive. Of course, the interval $a$ is the power factor angle of the load circuit.

Figure 2:
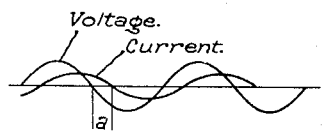
Figure 3:
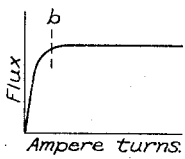

At the time when the current passes through its zero value as shown in Fig. 2, current tends to flow through the rectifier 13, switching means 23, reactance 19, rectifier 14, immersion-ignitor control member 9 of valve 5, and thence through the primary winding of transformer 4 to the supply circuit. After a definite time, that is, after a definite number of volt-degrees, the flux in the core 20 has been increased to effect saturation thereof. The term "volt-degree" is, of course, proportional to the integral of the number of turns times the derivative of the flux with respect to time; that is, the number of volt-degrees is proportional to the amount of flux in the core member, or core members, of the windings effectively connected in the circuit. Referring to Fig. 3, the point $b$ represents the portion of the saturation curve employed to effect abrupt saturation of the core or cores. At this point, the voltage across winding 21 of the inductive device 19 decreases abruptly and the current through the control circuit 16 rises rapidly, causing sufficient current to flow through the control member 9 of electric valve 5 and thereby causing it to conduct current due to the initiation of arc discharge between its anode and cathode. It will thus be understood that the ignition of the valve 5 has been delayed a definite interval depending upon the number of volt-degrees that are available in the inductive device 19 before saturation. By changing the number of turns, assuming that the same core structure is retained, or by changing the core, keeping the number of turns constant, it is possible to vary this amount of delay so that any predetermined lag or phase displacement may be obtained between the extinction of one valve and the firing of the next valve. This is in effect phase control.

Figure 4:
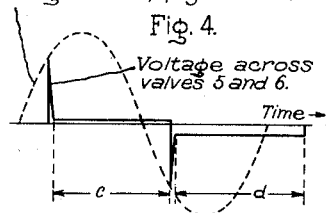
Figure 5:
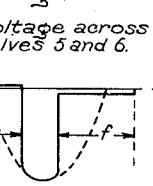
Figure 6:
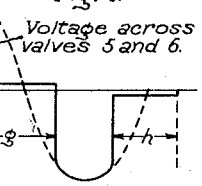
Figure 7:
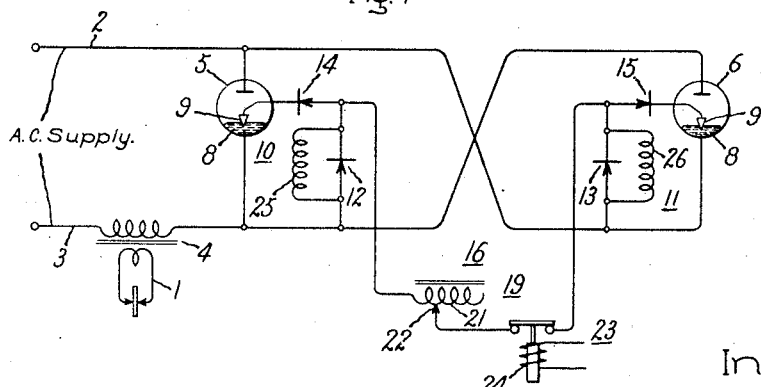

The manner in which the phase control of the electric valves 5 and 6 is obtained may be more fully appreciated by referring to the operating characteristics shown in Figs. 4–6. In Fig. 4 there is shown the voltage of the supply circuit and the voltage appearing across the electric valves 5 and 6 when the winding 21 of the inductive device 19 is completely shunted out of the control circuit 16 by moving the contact or tap 22 to the extreme left-hand position. It will be noted that the electric valves 5 and 6 are rendered conductive early in the half cycles of applied voltage and that the electric valves conduct current during the intervals c and d. This early or advanced firing of the valves 5 and 6 is obtained since substantially no inductance is present in the control circuit 16 and since the current immediately increases to a value sufficient to effect initiation of an arc discharge in that electric valve which was non-conducting substantially immediately upon the extinction of the conducting valve. By increasing the number of turns of winding 21 effectively connected in the control circuit 16, the time delay between the extinction of one valve and the ignition of the other may be increased. For example, the solid curve of Fig. 5 shows the voltage appearing across the valves 5 and 6 with approximately one half the turns of the winding 21 connected in the circuit. Of course, the electric valves conduct current during intervals e and f and, lastly, the solid curve of Fig. 6 shows the voltage which appears across the valves 5 and 6 upon a still further increase of the number of turns of winding 21 connected in the control circuit 16. In this instance the electric valves conduct current during the intervals g and h.

It will thus be appreciated that the adjustment of the contact 22 of the inductive device 19 affords a ready means of controlling the times during the positive half cycles of applied anode-cathode voltage at which electric valves 5 and 6 are rendered conductive and hence permits adjustment of the magnitude of the current transmitted to the load circuit 1.

If the switching means 23 is automatically operated by means of the timing circuit to effect closure of the circuit 16 for a predetermined interval of time or to effect intermittent closure thereof, it will be understood that the load circuit 1 will be energized accordingly, the value of the current transmitted to the load circuit 1 during each of the intervals being accurately adjustable or controlled by means of the inductive device 19. In one sense, the inductive device 19 is a phase control means for adjusting the phase of the ignition current for the valves 5 and 6.

Fig. 7 diagrammatically illustrates a modification of my invention which is similar in many respects to that shown in Fig. 1 and corresponding elements have been assigned like reference numerals. In the arrangement of Fig. 7, the winding 21 is shown as being associated with a single magnetic core. I have found that in some cases it is desirable to add suitable means, such as inductances 25 and 26, in shunt relation with the rectifiers 12 and 13 to reduce the average current transmitted to the control members under continuous operation and to control the wave form of the current transmitted to control members 9. Of course, it is not necessary to employ the inductances 25 and 26 under all conditions of operation, but it may be desirable in the event an inordinate duty is imposed upon the translating apparatus.

The operation of the embodiment of my invention shown in Fig. 7 is substantially the same in all fundamental aspects as the arrangement shown in Fig. 1. If the system be considered when current is commutated or transferred from valve 6 to valve 5, the current will flow through the following circuit: rectifier 13 and inductance 26 in parallel, switching means 23, winding 21, and a portion of this current will be transmitted to the control member 9 through the rectifier 14 and the remainder will be shunted therefrom through the inductance 25. It is thus apparent that by the adjustment or proportioning of the inductances 25 and 26, the amount of current transmitted to the control members 9 may be accurately determined.

Another important aspect of the inductances 25 and 26, which may be either air core inductances or iron core inductances, is the manner in which these inductances vary in impedance to effect the transmission of impulses of current to the immersion-ignitor control members 9. It is to be noted that since the core member, or core members, of the inductances 19 decrease substantially in impedance due to saturation, the voltage impressed across the control members increases very rapidly, the wave form of this voltage having a front which is substantially perpendicular. By virtue of this steep wave front, the inductive reactance of the inductances 25 and 26 is quite large at first and the larger part of the current transmitted by the circuit 16 is caused to flow through the rectifiers 14 and 15 and the associated immersion-ignitor control members 9. However, as the rate of change of this voltage decreases, the inductive reactance of inductances 25 and 26 substantially decreases so that a larger portion of the current will be transmitted through the inductances 25 and 26. In this manner the inductances 25 and 26 constitute a variable impedance path which effects the transmission of a large starting current of peaked wave form to the control members 9 by transmitting variable amounts of current depending upon the wave form of the voltage derived from circuit 16.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, an alternating current load circuit, electric translating apparatus connected between said circuits and comprising a pair of reversely connected electric valves each having an anode, a cathode and an immersion-ignitor control member in contact with the associated cathode and requiring the transmission of a predetermined minimum amount of current through said control member to initiate an arc discharge between the associated anode and cathode, a pair of excitation circuits, one of said excitation circuits being associated with one of said electric valves and the other of said excitation circuits being associated with the other of said electric valves and each of said excitation circuits comprising a unidirectional conducting device poled to transmit current from the supply circuit to the control member of said other electric valve, a control circuit interconnecting said excitation circuits and comprising a saturable inductive reactance for selectively advancing and retarding the time at which the critical current is transmitted to the control members.

2. In combination, an alternating current supply circuit, a load circuit, electric translating apparatus connected between said circuits and comprising a pair of reversely connected electric valves each having an anode, a cathode and an immersion-ignitor control member in contact with the associated cathode and requiring the transmission of a predetermined current through the control member in order to initiate an arc discharge between the associated anode and cathode, a pair of excitation circuits, one of said excitation circuits being associated with one of said electric valves and the other of said excitation circuits being associated with the other of said electric valves and each of said excitation circuits comprising a unidirectional conducting device poled to transmit current from the supply circuit to the control member of said other electric valve, a control circuit interconnecting said excitation circuits and comprising a saturable inductive reactance for selectively advancing and retarding the time at which the critical current is transmitted to the control members during the positive half cycles of applied anode-cathode voltage, and means for selectively opening and closing said control circuit.

3. In combination, an alternating current supply circuit, a load circuit, electric translating apparatus connected between said circuits and comprising a pair of reversely connected electric valve means each having an anode, a cathode and an immersion-ignitor control member in contact with the associated cathode and requiring the transmission of a predetermined critical minimum value of current to initiate an arc discharge between said associated anode and cathode, two pairs of serially connected unidirectional conducting devices, one pair of unidirectional conducting devices being connected between the control member and cathode of one of said electric valve means and the other pair of unidirectional conducting devices being connected between the control member and cathode of the other of said electric valve means, and a control circuit connected between the common junctures of said pairs of unidirectional conducting device for effecting energization of the control members from said supply circuit and including means for selectively advancing and retarding the time at which the critical current is transmitted to the control members during the positive half cycles of applied anode-cathode voltage.

4. In combination, an alternating current supply circuit, a load circuit, electric translating apparatus connected between said circuits and comprising a pair of reversely connected electric valve means each having an anode, a cathode and an immersion-ignitor control member in contact with the associated cathode and requiring the transmission of a predetermined critical minimum value of current to initiate an arc discharge between said associated anode and cathode, two pairs of serially connected unidirectional conducting devices, one pair of unidirectional conducting devices being connected between the control member and cathode of one of said electric valve means and the other pair of unidirectional conducting devices being connected between the control member and cathode of the other of said electric valve means, and a control circuit connected between the common junctures of said pairs of unidirectional conducting devices for effecting energization of the control members from said supply circuit and including a self-saturable inductive reactance for selectively advancing and retarding the time at which the critical value of current is transmitted to the control members during the positive half cycles of applied anode-cathode voltage to control an electrical condition of said load circuit.

5. In combination, an alternating current supply circuit, an alternating current load circuit, electric translating apparatus connected between said circuits and comprising a pair of reversely connected electric valves each having an anode, a cathode and an immersion-ignitor control member in contact with the associated cathode and requiring the transmission of a predetermined critical minimum value of current through the associated anode and cathode, a pair of excitation circuits, one of said excitation circuits being associated with one of said electric valves and the other of said excitation circuits being associated with the other of said electric valves and each of said excitation circuits comprising in series relation a pair of similarly poled unidirectional conducting devices, one unidirectional conducting device in each of said excitation circuits being connected to a different terminal of said alternating current supply circuit, and a circuit connected between the common junctures of said unidirectional conducting devices for selectively advancing and retarding the time during the positive half cycles of applied anode-cathode voltage at which the critical current is transmitted to the control members.

6. In combination, an alternating current supply circuit, an alternating current load circuit, electric translating apparatus connected between said circuits and comprising a pair of reversely connected electric valves each having an anode, a cathode and an immersion-ignitor control member in contact with the associated cathode and requiring the transmission of a predetermined value of current to effect initiation of an arc discharge between the associated anode and cathode, a pair of excitation circuits, one of said excitation circuits being associated with one of said electric valves and the other of said excitation circuits being associated with the other of said electric valves and each including in series relation a pair of similarly poled rectifying means, and means for interconnecting said excitation circuits to effect energization of the control member of each valve through one rectifying means in the excitation circuit of the other electric valve and including a self-saturable inductive reactance for selectively advancing and retarding the time during the positive cycles of applied anode-cathode voltage at which the critical value of current is transmitted to the control members to control an electrical condition of said load circuit.

7. In combination, an alternating current supply circuit, an alternating current load circuit, electric translating apparatus connected between said circuits and comprising a pair of reversely connected electric valves each having an anode, a cathode and an immersion-ignitor control member in contact with the associated cathode and requiring the transmission of a predetermined value of current to effect initiation of an arc discharge between the associated anode and cathode, a pair of excitation circuits, one of said excitation circuits being associated with one of said electric valves and the other of said excitation circuits being associated with the other of said electric valves and each including in series relation a pair of similarly poled rectifying means, a circuit connected between the common junctures of said rectifying means in each of said excitation circuits and including a self-saturable inductive device, and means for controlling said inductive device to selectively advance and retard the time during the positive half cycles of applied anode-cathode voltage at which the critical current is transmitted to said load circuit.

8. In combination, an alternating current supply circuit, an inductive load device, electric translating apparatus for effecting energization of said inductive device from said supply circuit and comprising a pair of reversely connected electric valve means each having an anode, a cathode and an immersion-ignitor control member in contact with said cathode and requiring the transmission of a predetermined critical current to initiate an arc discharge between the associated anode and cathode, and means for effecting energization of said load device during only a portion of each of the positive half cycles of voltage of said supply circuit comprising a pair of excitation circuits, one of said excitation circuits being associated with one of said electric valve means and the other of said excitation circuits being associated with the other of said electric valve means and each comprising a pair of similarly poled rectifying means, means for interconnecting said excitation circuits, one of said rectifying means in one of said excitation circuits being connected directly to one terminal of said alternating current supply circuit and one of said rectifying means in the other of said excitation circuits being connected to the other terminal of said alternating current circuit through said load device so that the excitation circuits are energized from the alternating current supply circuit during that portion of each half cycle of supply voltage during which the current and the voltage are of opposite polarity.

9. In combination, an alternating current supply circuit, a load circuit, electric translating apparatus connected between said circuits and comprising a pair of reversely connected electric valve means each having an anode, a cathode and an immersion-ignitor control member in contact with the associated cathode and requiring the transmission of a predetermined current through the control member in order to initiate an arc discharge between the associated anode and cathode, a pair of excitation circuits, one of said excitation circuits being associated with one of said electric valve means and the other of said excitation circuits being associated with the other of said electric valve means and each comprising in parallel relation a rectifier and an inductance, each rectifier being poled to transmit current from the supply circuit to the control member of the other electric valve, and a control circuit connected between said excitation circuits for effecting energization of the control members.

10. In combination, an alternating current supply circuit, an alternating current load circuit, electric translating apparatus connected between said circuits and comprising a pair of reversely connected electric valve means each having an anode, a cathode and an immersion-ignitor control member, a pair of excitation circuits, one of said excitation circuits being associated with one of said electric valve means and the other of said excitation circuits being associated with the other of said electric valve means, and a control circuit connected between said excitation circuits for selectively advancing and retarding the time during the positive half cycles of anode-cathode voltage applied to said electric valves at which said electric valves are rendered conductive and comprising a plurality of windings each having a different magnetic core and means for controlling the number of turns of said windings which are effectively connected in said control circuit.

11. In combination, an alternating current supply circuit, a load circuit, electric translating apparatus connected between said circuits and comprising a pair of reversely connected electric valve means each having an anode, a cathode and an immersion-ignitor control member in contact with the associated cathode and requiring the transmission of a predetermined current through the control member in order to initiate an arc discharge between the associated anode and cathode, a pair of excitation circuits, one of said excitation circuits being associated with one of said electric valve means and the other of said excitation circuits being associated with the other of said electric valve means and each comprising a rectifier poled to transmit current from the supply circuit to the control member of the other electric valve, a control circuit connected between said exicitation circuits for effecting energization of said excitation circuits, and a pair of inductances each connected across a different one of the rectifiers in said excitation circuits to offer a relatively large effective impedance to the transfer of current during the beginning of each energization of the control members in order to force the greater portion of the energizing current through the control members and to offer a substantially smaller impedance thereafter in order to effectively by-pass the control members upon the initiation of an arc discharge between the anodes and the cathodes.

ORRIN W. LIVINGSTON.